United States Patent [19]

Rado

[11] Patent Number: 4,756,897
[45] Date of Patent: Jul. 12, 1988

[54] PROCESS FOR PREPARING CONCENTRATED BYPRODUCT NITRATE SOLUTIONS

[75] Inventor: Theodore A. Rado, Oklahoma City, Okla.

[73] Assignee: Kerr-McGee Corporation, Oklahoma City, Okla.

[21] Appl. No.: 877,418

[22] Filed: Jun. 23, 1986

[51] Int. Cl.$^4$ .............................................. C01F 5/24
[52] U.S. Cl. ........................................ 423/396; 423/3; 423/165; 423/166; 423/430; 423/555
[58] Field of Search ............... 423/165, 430, 396, 166, 423/555, 3

[56] References Cited

U.S. PATENT DOCUMENTS

| | | | |
|---|---|---|---|
| 1,924,041 | 8/1933 | Johnson | 423/165 |
| 2,018,955 | 10/1935 | Heckert et al. | 423/555 |
| 2,044,942 | 6/1936 | Heckert et al. | 423/555 |
| 4,242,318 | 12/1980 | Brahm et al. | 423/430 |
| 4,321,235 | 3/1982 | Mouret et al. | 423/555 |
| 4,421,729 | 12/1983 | Chiang et al. | 423/430 |

FOREIGN PATENT DOCUMENTS

| | | | |
|---|---|---|---|
| 211129 | 10/1956 | Australia | 423/430 |
| 664365 | 5/1965 | Belgium | 423/430 |
| 441223 | 1/1936 | United Kingdom | 423/430 |
| 921077 | 3/1963 | United Kingdom | 423/430 |
| 1092184 | 11/1967 | United Kingdom | 423/430 |
| 1281685 | 7/1972 | United Kingdom | 423/430 |
| 704900 | 12/1979 | U.S.S.R. | 423/430 |

Primary Examiner—John Doll
Assistant Examiner—Wayne A. Langel
Attorney, Agent, or Firm—William G. Addison; John P. Ward

[57] ABSTRACT

A process is provided for preparing concentrated aqueous solutions of byproduct nitrate compounds from dilute aqueous streams containing said byproduct nitrate compounds, calcium ions and anionic species capable of reaction therewith at elevated temperatures. The process provides for the removal of the calcium ions by the addition of a source of carbonate ions to said stream to form solid, particulated calcium carbonate therein, the separation of the solid particulate from the stream, the neutralization of the stream and concentration of the stream to provide a concentrated aqueous solution containing the byproduct nitrate compound.

11 Claims, 1 Drawing Sheet

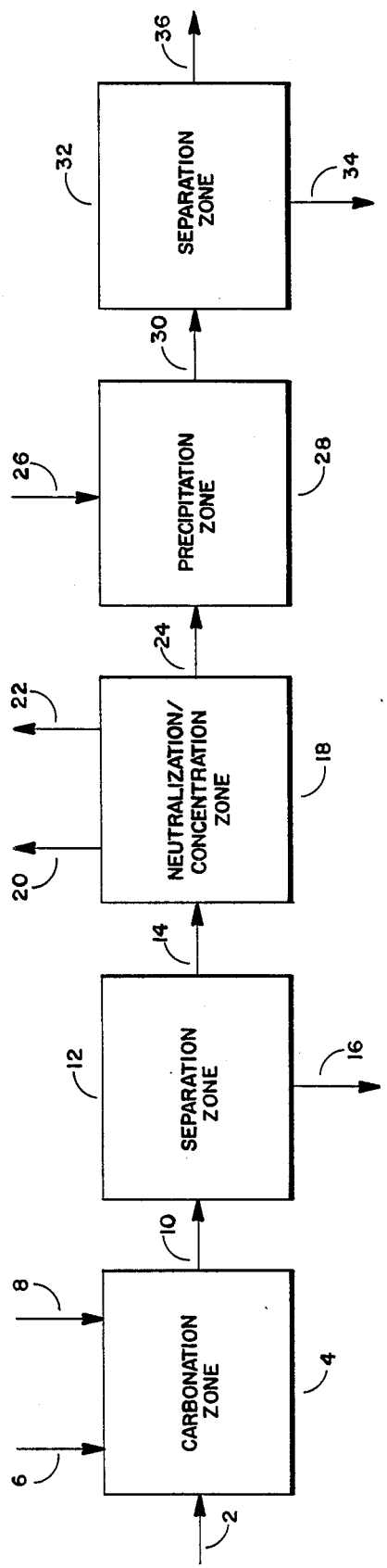

PROCESS FOR PREPARING CONCENTRATED BYPRODUCT NITRATE SOLUTIONS

FIELD OF THE INVENTION

The present invention relates to a process for preparing concentrated aqueous solutions of byproduct nitrate compounds. Most particularly, the invention provides a process for concentrating aqueous waste streams containing low levels of ammonium nitrate, calcium ions and anionic species capable of reacting with said calcium ions, wherein the reaction between the calcium ions and anionic species is avoided.

BACKGROUND OF THE INVENTION

In the refining of various ore concentrates such as, for example, uranium ore concentrates, there are produced aqueous waste streams which contain low, yet significant, levels of byproduct nitrate compounds, e.g., byproduct ammonium nitrate. Although the levels of the byproduct in these streams are low, the byproduct itself usually is of sufficient commercial value to render its recovery desirable. In general, however, such recovery has not been attempted in the past due, in part, to the technical difficulties perceived to be inherent in the processing of such streams.

These perceived technical difficulties arise as the result of the further presence in the above described aqueous waste streams of calcium ions and various anionic species. Under appropriate conditions, such as elevated temperatures, the calcium ions and the various anionic species can react with each other to form insoluble process disrupting materials which can, and do, adhere to internal surfaces of process equipment. For example, aqueous waste streams recovered from the refining of uranium ore concentrates are known to contain, in addition to the byproduct ammonium nitrate therein, both calcium and sulfate ions. Any attempt to concentrate the byproduct ammonium nitrate in these streams using conventional elevated temperature evaporative processes would result in these ions reacting with one another to form scaly deposits of calcium sulfate species within the evaporative equipment employed. As these deposits accumulate over a period of time, complete fouling or blockage of the evaporative equipment frequently would occur. Therefore, the need to frequently shut down such evaporative processes for removal of these deposits from the evaporative equipment would render the use of these processes both uneconomical and highly inefficient.

SUMMARY OF THE INVENTION

It now has been found that aqueous waste streams containing low, yet significant, levels of byproduct nitrate compounds and further containing calcium ions and anionic species capable of reacting with said calcium ions to form insoluble process disrupting materials can be treated in accordance with this invention whereby the formation of said process disrupting materials is avoided.

Broadly, the present invention provides a novel process for preparing concentrated aqueous solutions of byproduct nitrate compounds. Specifically, the novel process of this invention comprises the steps of providing a dilute aqueous solution having a substantially alkaline pH and containing a byproduct nitrate compound, calcium ions and anionic species capable of reacting with said calcium ions. A source of carbonate ions is introduced into this solution under conditions whereby said calcium and carbonate ions react to form a heterogenous mixture. This heterogenous mixture comprises a solid phase of particulate calcium carbonate suspended in a liquid phase comprised of the dilute aqueous solution containing the byproduct nitrate compound, a substantially reduced portion of the calcium ions and the whole of the anionic species. The liquid phase is recovered from said mixture and neutralized. Following neutralization, the liquid phase is concentrated by removal of water and any other volatile materials. A concentrated aqueous solution containing the byproduct nitrate compound, the substantially reduced portion of the calcium ions and the whole of the anionic species is produced.

In a preferred embodiment of the present invention, there also is provided means for removal of the anionic species from the concentrated solution. In this preferred embodiment, a source of calcium ions is introduced into the concentrated aqueous solution under conditions whereby said calcium and anionic species react to form a further heterogenous mixture comprised of a solid phase of a particulate reaction product of said calcium ions and anionic species suspended in a further liquid phase comprised of a concentrated aqueous solution containing the byproduct nitrate compound. Finally, this further heterogenous mixture is separated to recover the liquid phase comprised of the concentrated aqueous solution containing the byproduct nitrate compound.

BRIEF DESCRIPTION OF THE DRAWING

The single FIG. is a schematic diagram illustrating the principal steps employed in a preferred embodiment of the present invention.

DETAILED DESCRIPTION OF THE INVENTION

While the novel process of this invention has utility in the treatment of any aqueous waste stream containing low levels of byproduct nitrate compounds, calcium ions, and various reactive anionic species, the process has particular applicability for the treatment of dilute aqueous waste streams recovered from the refining of uranium ore concentrates. These aqueous waste streams generally have an essentially neutral solution pH and contain ammonium nitrate as the byproduct nitrate compound, calcium ions, and sulfate ions. In these particular streams, the sulfate ions constitute the anionic species capable of reaction with the calcium ions, the resulting calcium sulfate species being the process disrupting material sought to be avoided.

For purposes of clarity and ease of explanation only, the following detailed description is presented based upon the treatment of a dilute aqueous waste stream recovered from the refining of uranium ore concentrates.

Referring to the single FIG., a dilute aqueous waste stream containing low levels of ammonium nitrate and both calcium and sulfate ions is introduced through a conduit 2 into a carbonation zone 4 which may comprise one or more stirred vessels. A base material, capable of imparting a substantially alkaline solution pH to the dilute aqueous waste stream, is introduced into carbonation zone 4 through a conduit 6. Useful base materials for purposes of the present invention include the various well-known alkali metal hydroxides and carbonates, aqua ammonia (i.e., a dilute aqueous solution containing about 24 percent by weight of ammonia) and the like. In general, it is preferred to employ a base material in which the cation thereof is the same as that of the byproduct nitrate compound in the waste stream undergoing treatment in accordance with this invention. In this manner, no additional or diluting materials are introduced into the final concentrated byproduct-containing solution. Thus, in the particular instance of the treatment of dilute aqueous waste streams recovered from the refining of uranium ore concentrates, said streams containing low levels of byproduct ammonium nitrate, the preferred base material would be one containing ammonium cations such as, for example, aqua ammonia.

Sufficient quantities of the base material are combined with the dilute aqueous waste stream contained within carbonation zone 4 to provide said stream with a substantially alkaline pH. The term "substantially alkaline" as used herein means a pH of greater than about 8.5 and preferably from about 9.5 to about 10.0. Substantially alkaline pH conditions are necessary if, upon the subsequent addition of the carbonate source as described hereinbelow, the desired insoluble, non-adherent, calcium carbonate is to be formed. Under essentially neutral or only slightly alkaline pH conditions, the highly soluble and undesired bicarbonate is formed, effectively leaving the calcium ions intact in the waste stream.

Following addition of the base material to the dilute aqueous waste stream contained within carbonation zone 4, a source of carbonate ions is introduced into the carbonation zone 4 via a conduit 8. The source of carbonate ions can be any material capable of producing or generating carbonate ions within the dilute aqueous waste stream under the substantially alkaline pH conditions of this stream. Suitable examples of materials capable of providing or generating carbonate ions upon addition to the dilute aqueous waste stream include gaseous carbon dioxide or carbon dioxide containing gases, ammonium carbonate, and alkali metal carbonates such as sodium carbonate, potassium carbonate, and the like.

The amount of the carbonate ion source added to the dilute aqueous waste stream will be an amount capable of providing sufficient carbonate ions to react with a substantial portion of the calcium ions present in said stream. In general, the amount added will be an amount in excess of the stoichiometric amount required to provide for complete reaction of the carbonate ions with substantially all of the calcium ions present. Specifically, such excess can range from about 5 percent to about 10 percent above the stoichiometric amount.

When aqua ammonia is employed as the base material to provide the aqueous waste stream within carbonation zone 4 with a substantially alkaline pH within the range specified above, a most useful source of carbonate ions is ammonium carbonate. This particular source of carbonate ions readily can be prepared, in situ, by bubbling carbon dioxide gas or a carbon dioxide containing gas through the aqua ammonia solution prior to the addition of the aqua ammonia solution to carbonation zone 4. In this particular embodiment, the need for the separate addition of the carbonate ion source to carbonation zone 4 through conduit 8 becomes unnecessary. Alternatively, the carbon dioxide gas or carbon dioxide containing gas can be added directly to carbonation zone 4 through conduit 8. In this alternative embodiment, the desired ammonium carbonate is formed, in situ, within said carbonation zone 4.

Following addition of the base material and the source of carbonate ions, the carbonate ions and calcium ions undergo reaction to form a heterogenous reaction mixture. This heterogenous reaction mixture comprises a solid phase of particulated calcium carbonate suspended in a liquid phase comprised of a dilute aqueous solution containing low levels of ammonium nitrate, a substantially reduced portion of the calcium ions, and the sulfate ions. While in carbonation zone 4, the solid phase of particulate calcium carbonate is maintained in suspension in the liquid phase. Subsequently, the heterogenous mixture of said solid and liquid phases is withdrawn from carbonation zone 4 via a conduit 10 and introduced into a separation zone 12.

The term "substantially reduced portion", as used herein, means a remaining amount of said calcium ions in the liquid phase so small that during the subsequent concentration of the liquid phase little or no reaction will or can take place between the remaining calcium ions and the sulfate ions contained in the liquid phase. In general, such substantially reduced portion will comprise 10 percent and less by weight of the calcium ions present in the original dilute aqueous waste stream introduced through conduit 2 into carbonation zone 4.

Separation zone 12 may comprise any known means capable of separating solids and liquids. Such means may include, for example, pressure leaf filters, centrifuges, and the like. Within separation zone 12, the solid phase of suspended particulate calcium carbonate and the liquid phase comprised of the dilute aqueous solution are separated one from the other. The solid phase is recovered from separation zone 12 by way of a conduit 16 and the desired liquid phase is removed from separation zone 12 through a conduit 14.

The separated liquid phase comprised of the dilute aqueous solution containing low levels of the ammonium nitrate, the substantially reduced portion of calcium ions and the sulfate ions, is conveyed and introduced by way of conduit 14 into a neutralization/concentration zone 18. Neutralization/concentration zone 18 will be comprised of multiple vessels, at least one of said vessels constituting a neutralization section (not shown). Within this section neutralization of the liquid phase is effected. When the base material, added to the original aqueous waste stream to provide the dilute aqueous solution having a substantially alkaline solution pH, i.e., a pH greater than about 8.5, is aqua ammonia then the vessel employed in the neutralization of the liquid phase can be of the simple extractor or distillation type. Representative examples of such types include column-type vessels of open design or containing various internals such as alternate segmental trays, perforated trays, packing materials, and the like. Within the distillation vessel, ammonia readily is removed from the liquid phase under suitable elevated temperature conditions to render the liquid phase substantially neutral. The ammonia removed from the liquid phase in the distillation vessel of the neutralization section of neutralization/concentration zone 18 is withdrawn from this zone 18 by way of a conduit 20. If desired, the ammonia thus removed from the liquid phase can be recovered and employed to prepare the aqua ammonia solution used within carbonation zone 4.

Within neutralization/concentration zone 18 the neutralized liquid phase then is subjected to concentration in a concentration section (not shown) for the removal of water which is withdrawn from neutralization/concentration zone 18 by way of a conduit 22. The concentration section of neutralization/concentration zone 18 can comprise any apparatus known in the art for the evaporation of liquids. Typical examples of apparatus which can be used to effect the concentration of the neutralized liquid phase include forced circulation evaporators, short tube verticle or calandria evaporators, horizontal tube evaporators, and the like. Of these types of evaporators the forced circulation-type evaporators are preferred since circulation of the neutralized liquid phase through this type of evaporator is least affected by boiling action and, in addition, will not allow any solids which might form to settle out.

Generally, for purposes of the present invention, it will be preferred to employ two or more of any of the above types of evaporators in series to achieve a multiple effect operation. Multiple effect operation is less expensive than single effect operation utilizing a single evaporator for the reasons that it reduces the amount of prime steam needed and cooling water to condense the final vapor. In a preferred embodiment, three evaporators will be employed in series to effect the concentration of the neutralized liquid phase. For a more complete description of the different types of evaporative apparatus and the multiple effect operation which can be employed in the use of the process of the present invention reference is made to Kirk-Othmer, *Encyclopedia of Chemical Technology*, Vol. 8, ppg. 563-577, 2d Ed. (1966). The teachings of this reference as they relate to evaporative apparatus and multiple effect operations are incorporated herein by reference in their entirety.

The neutralized and concentrated liquid phase, which exits neutralization/concentration zone 18 through conduit 24, will contain approximately 88 weight percent and greater of total dissolved solids. Of these total dissolved solids, the ammonium nitrate will amount to about 78 weight percent or greater.

The above neutralized and concentrated liquid phase also will contain about 5 weight percent of sulfate ions. In many of the applications in which this liquid phase can be employed, such as for example, commercial explosives, this level of sulfate ion content can be detrimental. Therefore, in the preferred embodiment of the present invention the liquid phase recovered from neutralization/concentration zone 18 further will be processed to remove substantially all of the sulfate ion present therein.

Referring once again to the single FIG., in this preferred embodiment, the liquid phase recovered from neutralization/concentration zone 18 is conveyed, by way of a conduit 24, to a precipitation zone 28. To remove the sulfate ions from the liquid phase within this precipitation zone 28, a source of calcium ions is introduced thereto through a conduit 26. This source of calcium ions can be any material capable of undergoing dissociation in the liquid phase to provide calcium ions for reaction with the sulfate ions and thereby form a second heterogenous mixture. This second heterogenous mixture will comprise a solid phase of particulate calcium sulfate and a second liquid phase comprised of a concentrated aqueous solution of ammonium nitrate. The second heterogenous mixture is withdrawn from precipitation zone 28 by way of a conduit 30 and introduced into a separation zone 32. Representative examples of useful sources of calcium ions include calcium hydroxide, calcium oxide, and calcium nitrate, the latter being most preferred.

Within separation zone 32 the heterogenous mixture of solid particulate calcium sulfate and the concentrated aqueous solution of ammonium nitrate is separated. Following separation, the solid phase is recovered from separation zone 32 through a conduit 34 while the desired product, i.e., the liquid phase comprised of a concentrated aqueous solution of ammonium nitrate is recovered through a conduit 36. As with separation zone 12, separation zone 32 can comprise any known means capable of separating solids and liquids. As disclosed hereinabove these can include pressure leaf filters, centrifuges, and the like.

While the invention has been described particularly with regard to certain perferred embodiments, changes may be made in the construction, operation and arrangement of the various parts, elements, steps, and procedures described herein without departing from the concept and scope of the invention as defined in the following claims.

What is claimed is:

1. A process for preparing a concentrated aqueous solution of ammonium nitrate, further containing sulfate ions and a substantially reduced portion of calcium ions from a dilute aqueous waste stream, said stream being characterized by having a neutral pH and containing ammonium nitrate and sulfate ions and calcium ions, which process comprises the steps of:

adding a base material to said dilute aqueous waste stream whereby the pH of said dilute aqueous waste stream is increased to an alkaline pH value greater than about 8.5;

adding to said dilute alkaline aqueous waste stream a source of carbonate ions whereby said calcium and carbonate ions react to form a heterogenous mixture comprised of a solid phase of particulate calcium carbonate suspended in a liquid phase comprised of a dilute alkaline aqueous solution, said solution containing the ammonium nitrate, the sulfate ions and a substantially reduced portion of the calcium ions;

separating the solid and liquid phases of said hetergenous mixture and recovering and neutralizing said liquid phase; and concentrating said neutralized liquid phase whereby the concentrated aqueous solution of ammonium nitrate, further containing the sulfate ions and the substantially reduced portion of the calcium ions, is produced.

2. The process of claim 1 further comprising:

introducing a source of calcium ions into said concentrated aqueous solution of the ammonium nitrate, further containing the sulfate ions and the substantially reduced portion of the calcium ions, whereby said sulfate ions and calcium ions react to form a further hetergenous mixture comprised of a solid phase of particulate calcium sulfate and a further liquid phase comprised of a concentrated aqueous solution containing ammonium nitrate; and separating and recovering from said further heterogenous mixture said further liquid phase comprised of said concentrated aqueous solution of ammonium nitrate.

3. A process for preparing a concentrated aqueous solution of ammonium nitrate, further containing sulfate ions and a substantially reduced portion of calcium ions from a dilute aqueous waste stream recovered from the refining of uranium ore concentrates, said stream being characterized by having a neutral pH and containing ammonium nitrate, sulfate ions and calcium ions, which process comprises the steps of:

adding ammonia, in the form of an aqua ammonia solution, to said dilute aqueous waste stream whereby the pH of said dilute aqueous waste stream is increased to an alkaline pH value greater than about 8.5;

adding a source of carbonate ions to said dilute alkaline aqueous waste stream whereby the calcium and carbonate ions react to form a heterogenous mixture comprised of a solid phase of particulate calcium carbonate suspended in a liquid phase comprised of a dilute alkaline aqueous solution, said solution containing the ammonium nitrate, the sulfate ions and a substantially reduced portion of the calcium ions;

separating the solid and liquid phases of said heterogenous mixture and recovering and neutralizing said liquid phase; and concentrating said neutralized liquid phase whereby the concentrate aqueous solution of ammonium nitrate, further containing the sulfate ions and the substantially reduced portion of the calcium ions, is produced.

4. The process of claim 3 wherein the separating of the solid and liquid phases of said heterogenous mixture comprises filtering said heterogenous mixture to separate said solid phase from said liquid phase and wherein the neutralizing of said liquid phase comprises removing the added ammonia from said liquid phase.

5. The process of claim 4 wherein the removing of said added ammonia from said liquid phase comprises subjecting said liquid phase to elevated temperatures sufficient to effect removal of the added ammonia.

6. The process of claim 3 wherein said source of carbonate ion is selected from the group consisting of gaseous carbon dioxide, carbon dioxide containing gases, alkali metal carbonates, and ammonium carbonate.

7. The process of claim 6 wherein said source of carbonate ion is ammonium carbonate.

8. The process of claim 3 further comprising:

introducing a source of calcium ions into said concentrated aqueous solution of the ammonium nitrate, further containing the sulfate ions and the substantially reduced portion of the calcium ions, whereby said sulfate ions and calcium ions react to form a further heterogenous mixture comprised of a solid phase of particulate calcium sulfate and a further liquid phase comprised of a concentrated aqueous solution containing ammonium nitrate; and separating and recovering from said further heterogenous mixture said further liquid phase comprised of said concentrated aqueous solution of ammonium nitrate.

9. The process of claim 8 wherein said source of calcium ions is selected from the group consisting of calcium nitrate, calcium oxide and calcium hydroxide.

10. The process of claim 8 wherein the recovering of said further liquid phase comprises filtering said further heterogenous mixture to separate said solid phase of particulate calcium sulfate from said further liquid phase comprised of the concentrated aqueous solution containing byproduct ammonium nitrate.

11. The process of claim 3 wherein the concentrating of said liquid phase comprises subjecting said liquid phase to elevated temperatures sufficient to effect removal of water.

* * * * *